United States Patent [19]

Hasegawa

[11] 4,257,800

[45] Mar. 24, 1981

[54] DECORATIVE AIR BUBBLE FORMATION IN GLASSWARE

[75] Inventor: Katsundo Hasegawa, Yachiyo, Japan

[73] Assignee: Owens-Illinois, Inc., Toledo, Ohio

[21] Appl. No.: 58,637

[22] Filed: Jul. 19, 1979

[30] Foreign Application Priority Data

Jul. 26, 1978 [JP] Japan .............................. 53-102687[U]

[51] Int. Cl.³ .............................................. C03B 7/08
[52] U.S. Cl. ........................................ 65/221; 65/330; 65/332
[58] Field of Search ................... 65/330, 332, 221, 22, 65/75, 126, 129, 132

[56] References Cited

U.S. PATENT DOCUMENTS

| 1,592,299 | 7/1926 | Howard | 65/221 X |
| 1,995,276 | 3/1935 | Howard | 65/221 X |

FOREIGN PATENT DOCUMENTS

54-23613 2/1979 Japan .

Primary Examiner—William F. Smith
Attorney, Agent, or Firm—Harold F. Mensing; Myron E. Click; D. H. Wilson

[57] ABSTRACT

A glass article such as a sham bottom tumbler with a decorative air bubble encapsulated in its base is produced on existing automatic glass-forming machines by injecting a bubble of air into a charge of molten glass in the gob-feeder section of a glass furnace as the charge is being formed into a gob. This is accomplished by mounting an air supply pipe in the gob-feeder orifice. Preferably, the outlet end of the pipe extends radially to the center of the orifice. Puffs of compressed air are supplied in synchronism with the feeder plunger cycle so an air bubble is formed in the lower end of the gob, and the gob is then formed by normal procedures into a finished article.

2 Claims, 13 Drawing Figures

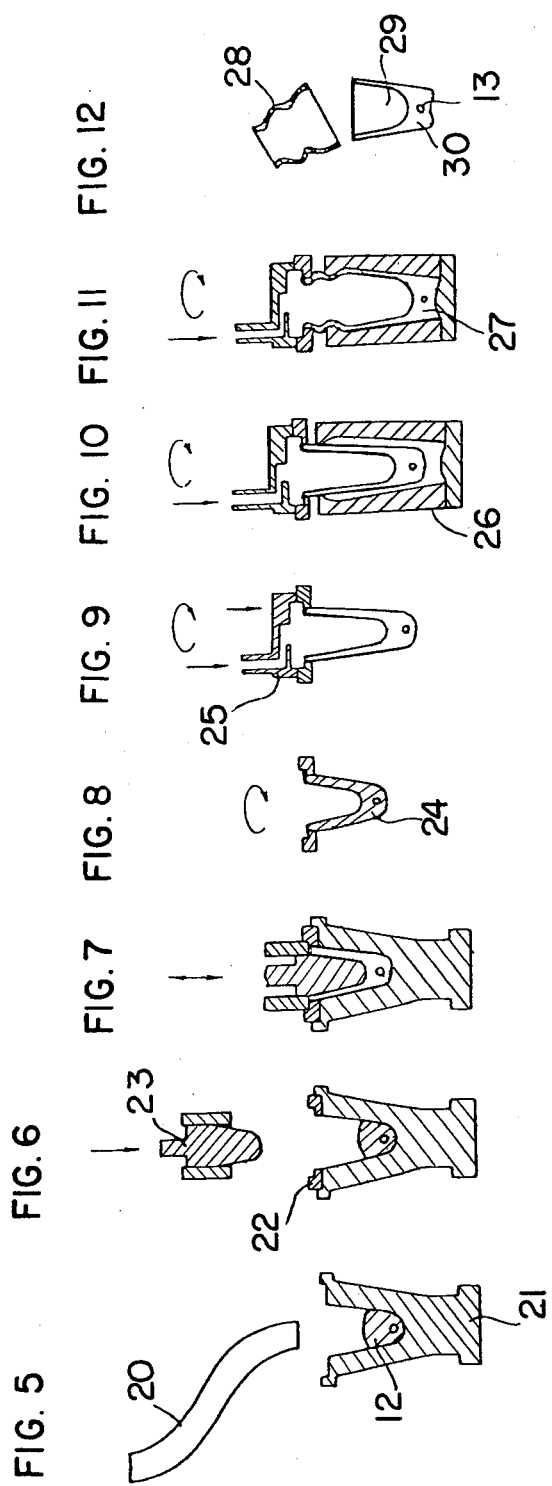

4,257,800

DECORATIVE AIR BUBBLE FORMATION IN GLASSWARE

BACKGROUND OF THE INVENTION

This invention relates to a glassware manufacturing method in which an air bubble is encapsulated in a thick part of the bottom of the glassware and also relates to a gob feeder having an air injection means to be used for carrying out this method.

To further the ornamentality of glassware items in addition to their ornamental shapes, there have been practiced various methods for forming voids within thick parts of them to utilize the refraction and reflection of glass by taking advantage of the transparency of glass. Of these methods, a method of enclosing air within a thick part of the bottom of a glassware item to form an air bubble therein has long been practiced.

The conventional method of forming an air bubble within a thick part of the bottom of a glassware has been carried out by manually enclosing air in the thick part of the bottom during a process of forming the glassware. The conventional manual method has low production efficiency and also requires a high degree of skill.

It is an object of this invention to provide a glassware manufacturing method in which an air bubble is injected into a molten charge of glass as it is being formed into a gob which is subsequently formed into a finished article using either an automatic pressing machine such as a Lynch press machine or a machine called Hartford H-28 or an automatic press-and-blow molding machine.

It is another object of this invention to provide a gob feeder with an air bubble injection device which uniformly positions air bubbles in successive charges of molten glass as they are being formed into gobs.

SUMMARY OF THE INVENTION

This invention relates to a feeder which supplies a charge of molten glass to a molding machine and injects a bubble of air into the charge at a precise location within the charge by discharging a predetermined quantity of air under pressure from the outlet end of an air discharge pipe located within an orifice of the feeder. The charge of molten glass containing an air bubble is extruded from the orifice and cut off by a shearing mechanism into a gob. Then, the gob is supplied to a molding machine to be formed into an air bubble containing glassware item through a pressing or press-and-blow process.

The above and other objects and features of the invention will be apparent from the following description of embodiments thereof when read in conjunction with the accompanying drawings.

BRIEF DESCRIPTION OF THE DRAWINGS

FIGS. 5-11 schematically show the progressive stages in the formation of a tumbler from a molten glass gob containing an air bubble;

FIG. 12 is an elevational cross-sectional view of an example of a tumbler produced by this invention.

DETAILED DESCRIPTION OF THE DRAWINGS

Figure 1:
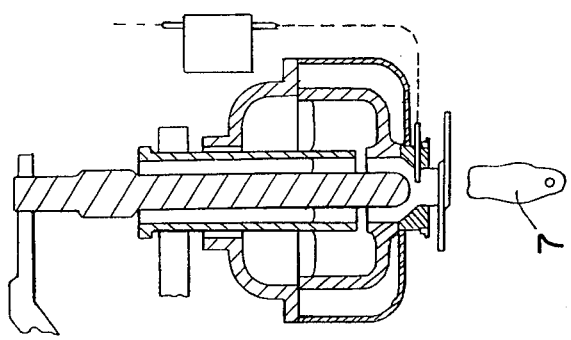
FIGS. 1-4 are elevational cross-sectional views of a gob forming-feeder apparatus showing four positions of the plunger during an air bubble injection cycle.

Referring to FIGS. 1-4, wherein there is shown a glass gob feeder 1 having as basic constituents a spout 9 which receives molten glass 3 from a glass-melting furnace, a plunger 2 which is attached to a support arm 11 arranged to vertically reciprocate in synchronism with a molding machine, and a concentric tube 10 which in cooperation with the plunger controls the flow of the molten glass 3 into an orifice ring 4. The molten glass 3 is intermittently extruded out of the orifice ring 4 by the reciprocating action of the plunger, and then the extruded portion is severed from the remainder by a shearing mechanism 5.

In addition to this basic combination, the glass gob feeder 1 further includes a pressure air discharging hollow pipe 8 which extends horizontally or radially through the orifice ring from the outside. The outlet end of the pipe 8 is within the molten glass 3 located within the orifice ring 4, preferably at the center. The pipe 8 is made of a heat-resisting metal such as platinum and rhodium and is connected at its external end through air piping to a compressed air supply device 12 which supplies a preset amount of air with a preset degree of pressure to the pipe 8 in synchronism with the up-and-down movement of the plunger 2.

The molding machine employed in this embodiment is an ordinary known press-and-blow molding (not shown), the functions of which are illustrated in FIGS. 5-12. The molding machine comprises a parison molding section which has a press mold 21 and a plunger 23 for forming a parison 24. A parison transfer or neck ring 22 is provided to transfer the press-formed parison 24 from the press mold 21 to a blow molding section where the parison is blown by a blow head 25 into its final form in a blow mold 26.

Figure 2:
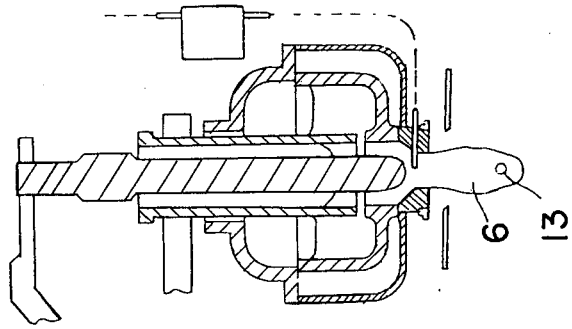
Figure 3:
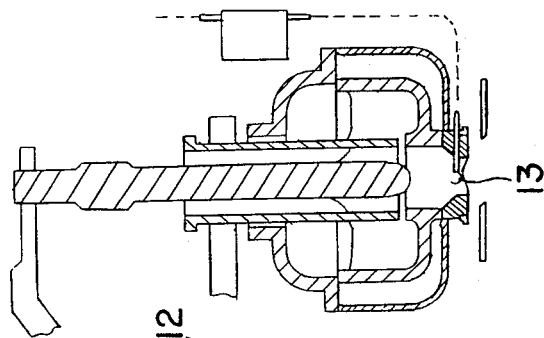

With the gob feeder arranged as described in the foregoing, a glassware item containing a bubble therein is formed through the following steps:

The molten glass 3 which has been melted by a melting furnace (not shown) is guided to the gob feeder 1 through a forehearth which is also not shown. First, the support arm 11 of a vertical reciprocating device which is not shown but is arranged to reciprocate in synchronism with the molding machine causes the plunger to begin to ascend as shown in FIG. 1. The plunger 2 reaches the upper dead point, and the compressed air supply device supplies a preset amount of air at a preset degree of pressure to the pressure air discharging hollow pipe 8 in synchronism with the plunger 2. The pipe 8 which opens within the molten glass 3 in the orifice ring 4 then discharges, with pressure, this air supply into the molten glass 3 to form an air bubble 13 within the molten glass 3 as shown in FIG. 2. Following this, the molten glass 3 which has been thus caused to contain the air bubble 13 within the orifice ring 4 is extruded out of the orifice ring 4 by the descending plunger 2 before the plunger 2 reaches the lower dead point thereof as shown in FIG. 3.

Figure 4:
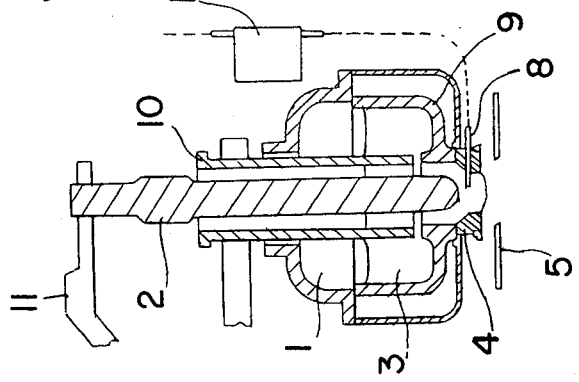

The shearing mechanism 5 which is arranged to work in synchronism with the plunger 2 then cuts off the extruded glass 6 into the form of a glass gob 7 which has the air bubble contained therein as shown in FIG. 4. A gob delivery member 20 then causes the glass gob 7 to slide down thereon to the inside of the press mold 21 of the molding machine as shown in FIG. 5.

A neck ring mold 22 is fitted to the press mold 21 as shown in FIG. 6. Then, the plunger 23 which has a plunger ring comes into the press mold 21 to press and shape the gob 12 into a parison 24 as shown in FIG. 7. At this time, since the parison 24 is arranged to have a sufficiently thick part formed in the bottom thereof by a metal mold, the air bubble 9 which has been included in the gob 12 remains in the thick part in the bottom of the parison 24 (normally, the thickness of the air bubble enclosing part must at least five times as much as the diameter of the air bubble 9). The parison 24 is taken out of the press mold 21 and is caused by the neck ring mold 22 to rotate on its axis in the direction of an arrow as shown in FIG. 8. While the parison 24 is thus rotated, a blow head 25 is put thereon to swell it by blowing as shown in FIG. 9.

Figure 13:
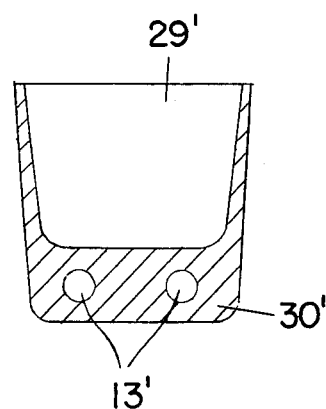
FIG. 13 is an enlarged, elevational, cross-sectional view of an example similar to FIG. 12 but with two decorative air bubbles.

The swollen parison 24 is transferred to the inside of a blow mold 26 as shown in FIG. 10 and is rotated and blown into a desired shape as shown in FIG. 11 to obtain a shaped product 27. Then, the shaped product 27 is taken out of the blow mold 26. An unnecessary portion 28 in the upper part of the shaped product 27 is cut off by a suitable method such as a burn-off method to finish it into a glassware 29 having an air bubble in the thick part 30 of the bottom portion thereof as shown in FIG. 12. More than one air bubble can be injected into the thick part 30 by providing additional pipes or air discharge outlets. FIG. 13 is an example of a tumbler 29' with two decorative air bubbles 13'.

The present invention is applicable also to molding by a pressing process wherein the press mold 21 and the plunger 23 which are used in the pressing step of the above-stated embodiment example are designed to impart a desired ultimate shape to the product.

The lateral position of air bubble 13 or 13' within a thick wall part 30 of the bottom of a glass tumbler 29 is determined by the relative lateral position of the outlet end of the pressure air discharging hollow pipe 8 within the orifice ring 4, while the vertical position of the air bubble is determined by the point of time at which the compressed air is supplied in relation to the descent of the plunger 2. In a practical application of the invention, the above-stated positioning adjustment of the air bubble within the glassware product requires that the synchronized operation of the compressed air supply device 12 with the plunger 2 must be unvarying and that the molten glass 3 and every part of the inner surface of the press mold 21 must have uniform temperature distribution.

I claim:

1. An apparatus for forming a gob of molten glass and injecting a decorative air bubble in the gob as it is being formed, said apparatus comprising a gob feeder having a molten glass reservoir with an orifice in the bottom thereof, an elongated vertically disposed reciprocal plunger having a tip extending adjacent to said orifice, means for reciprocating said plunger, at least one air supply tube extending from the side of said reservoir into the molten glass in said orifice at a level below the lowest point of travel of the plunger tip and means for supplying a preset amount of pressurized air to said tube at intervals in synchronism with the reciprocal movements of said plunger so as to form at least one bubble in said molten glass.

2. An apparatus according to claim 1 having a plurality of said air supply tubes extending from the side of said reservoir into the molten glass in said orifice.

* * * * *